United States Patent
Zhang

(10) Patent No.: US 11,989,342 B2
(45) Date of Patent: May 21, 2024

(54) VIRTUAL TOURISM CLIENT, SERVER, SYSTEM AND ACQUISITION DEVICE

(71) Applicant: BOE Technology Group Co., Ltd., Beijing (CN)

(72) Inventor: Yongzhong Zhang, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 42 days.

(21) Appl. No.: 17/848,411

(22) Filed: Jun. 24, 2022

(65) Prior Publication Data
US 2022/0317766 A1 Oct. 6, 2022

Related U.S. Application Data

(63) Continuation-in-part of application No. 16/908,759, filed on Jun. 23, 2020, now Pat. No. 11,565,190.

(30) Foreign Application Priority Data

Sep. 30, 2019 (CN) .......................... 201910938062.X

(51) Int. Cl.
*G06F 3/01* (2006.01)
*A63G 31/16* (2006.01)
(Continued)

(52) U.S. Cl.
CPC ............. *G06F 3/012* (2013.01); *A63G 31/16* (2013.01); *G06F 3/013* (2013.01); *G06T 3/4053* (2013.01);
(Continued)

(58) Field of Classification Search
None
See application file for complete search history.

(56) References Cited

U.S. PATENT DOCUMENTS

| | | |
|---|---|---|
| 2001/0025261 A1 | 9/2001 | Olefson |
| 2008/0157940 A1 | 7/2008 | Breed et al. |

(Continued)

FOREIGN PATENT DOCUMENTS

| | | |
|---|---|---|
| CN | 204291252 U | 4/2015 |
| CN | 105763843 A | 7/2016 |

(Continued)

OTHER PUBLICATIONS

Office Action dated Mar. 25, 2022 for U.S. Appl. No. 16/908,759.
Office Action dated Oct. 10, 2022 for Chinese Patent Application No. 201910938062.X and English Translation.

*Primary Examiner* — Jwalant Amin
(74) *Attorney, Agent, or Firm* — Ling Wu; Stephen Yang; Ling and Yang Intellectual Property

(57) ABSTRACT

A virtual tourism client device, a virtual tourism server-side device, a system, and an image acquisition device are provided. The virtual tourism client device includes a detector and a head display, the detector being configured to detect a change of a viewing direction of a user in real time and generate viewing direction information of the user according to the change of the viewing direction, wherein the change of the viewing direction is a change of a current viewing direction of the user with respect to a reference viewing direction; and the head display being configured to obtain a part of video image data corresponding to the viewing direction information of the user from panoramic video image data with an image reference direction and play the part of the video image data.

13 Claims, 6 Drawing Sheets

(51) Int. Cl.
  *G06T 3/4053* (2024.01)
  *G06T 7/246* (2017.01)
  *H04N 23/698* (2023.01)
  *A47C 1/02* (2006.01)
  *G06F 1/16* (2006.01)
  *G06Q 50/10* (2012.01)

(52) U.S. Cl.
  CPC .......... *G06T 7/248* (2017.01); *H04N 23/698* (2023.01); *A47C 1/02* (2013.01); *G06F 1/163* (2013.01); *G06Q 50/10* (2013.01)

(56) References Cited

U.S. PATENT DOCUMENTS

| | | |
|---|---|---|
| 2011/0314090 A1 | 12/2011 | Cardu |
| 2015/0174981 A1 | 6/2015 | Buma |
| 2015/0281507 A1 | 10/2015 | Konen et al. |
| 2016/0187969 A1 | 6/2016 | Larsen et al. |
| 2016/0300392 A1 | 10/2016 | Jonczyk et al. |
| 2018/0221621 A1 | 8/2018 | Kanemaru et al. |
| 2019/0152348 A1 | 5/2019 | Ishida |

FOREIGN PATENT DOCUMENTS

| | | | |
|---|---|---|---|
| CN | 106375347 A | | 2/2017 |
| CN | 106502427 A | | 3/2017 |
| CN | 107852489 A | | 3/2018 |
| CN | 108370440 A | | 8/2018 |
| CN | 108521432 A | | 9/2018 |
| CN | 108550088 A | | 9/2018 |
| CN | 109766735 A | * | 5/2019 |
| IN | 204405948 U | | 6/2015 |
| JP | 2000116718 A | | 4/2000 |
| JP | 2004056335 A | * | 2/2004 |
| JP | 2018013396 A | | 1/2018 |
| JP | 2018013396 A | * | 1/2018 |
| JP | 2018171455 A | * | 11/2018 |
| JP | 2018171455 A | | 11/2018 |
| KR | 10-2018-0002426 A | | 1/2018 |
| WO | WO2016023642 A1 | | 2/2016 |
| WO | 2019060985 A1 | | 4/2019 |

\* cited by examiner

VIRTUAL TOURISM CLIENT, SERVER, SYSTEM AND ACQUISITION DEVICE

CROSS-REFERENCE TO RELATED APPLICATIONS

The present application is a continuation-in-part application of the U.S. application Ser. No. 16/908,759 filed on Jun. 23, 2020, which claims the priority to the Chinese Patent Application No. 201910938062.X filed to the CNIPA on Sep. 30, 2019. The entire contents of the above-identified applications are hereby incorporated by reference.

TECHNICAL FIELD

Embodiment of the present disclosure relates to the field of virtual display technologies, in particular to a virtual tourism client, a virtual tourism server, a system and an image acquisition device.

BACKGROUND

Tourism has become a common choice for people to enrich their leisure life. However, people need to spend not only time and money, but also a lot of energy and physical strength to travel. Especially for the elderly, the sick, the disabled and other people with mobility difficulties, tourism have become an unattainable luxury. At present, virtual tourism through an electronic device has become an alternative, but the reality and immersion of virtual tourism realized by the electronic device are poor. Some virtual tourism solutions are implemented by remote-controlled cameras. A group of cameras can only serve for one user, thus causing serious waste of resources.

SUMMARY

The following is a summary of the subject matter described in detail in this document. This summary is not intended to limit the protection scope of the claims.

Embodiments of the present disclosure provide a virtual tourism client device, a virtual tourism server-side device, a system, and an image acquisition device.

In one aspect, an embodiment of the present disclosure provides a virtual tourism client device, including a detector and a head display, the detector being configured to detect a change of a viewing direction of a user in real time and generate viewing direction information of the user according to the change of the viewing direction, wherein the change of the viewing direction is a change of a current viewing direction of the user with respect to a reference viewing direction; and the head display being configured to obtain a part of the video image data corresponding to the user viewing direction information from panoramic video image data with an image reference direction and play the part of the video image data.

In another aspect, an embodiment of the present disclosure provides a virtual tourism server-side device, including an image source memory and a second processor, the image source memory being configured to store panoramic video image data of a tourism scene; and the second processor being configured to select a corresponding part of video image data from the panoramic video image data according to a user viewing direction information sent by a virtual tourism client device and send the part of the video image data to the virtual tourism client device for playing by the virtual tourism client device.

In another aspect, an embodiment of the present disclosure provides a video image acquisition device, including an image acquisition apparatus and a third processor, the image acquisition apparatus being configured to acquire panoramic video image data; and the third processor being configured to mark an image reference direction of a panoramic video image in the acquired panoramic video image data according to a movement direction of the image acquisition apparatus while the image acquisition apparatus acquires the panoramic video image data.

In another aspect, an embodiment of the present disclosure provides a virtual tourism system including the aforementioned virtual tourism client device and virtual tourism server-side device.

In another aspect, an embodiment of the present disclosure also provides a virtual tourism method, including: detecting, by a virtual tourism client device, a change of a viewing direction of a user in real time, generating viewing direction information of the user according to the change of the viewing direction, wherein the change of the viewing direction is a change of a current viewing direction of the user with respect to a reference viewing direction; and obtaining a part of the video image data corresponding to the current viewing direction of the user from stored panoramic video image data according to the viewing direction information of the user and play the part of the video image.

In another aspect, an embodiment of the present disclosure also provides a non-transitory computer readable storage medium, storing computer executable instructions for implementing the virtual tourism method.

Other features and advantages of the present disclosure will be set forth in the description which follows, and in part will become apparent from the description, or may be learned by practice of the present disclosure. Other advantages of the present disclosure may be realized and obtained by solutions described in the specification, claims and drawings.

Other aspects will become apparent upon reading and understanding accompanying drawings and the detailed description.

BRIEF DESCRIPTION OF DRAWINGS

Accompanying drawings are used to provide a further understanding of technical solutions of the present disclosure and form a part of the specification. Together with embodiments of the present disclosure, they are used to explain technical solutions of the present disclosure and do not constitute a limitation on the technical solutions of the present disclosure.

DETAILED DESCRIPTION

Figure 1:
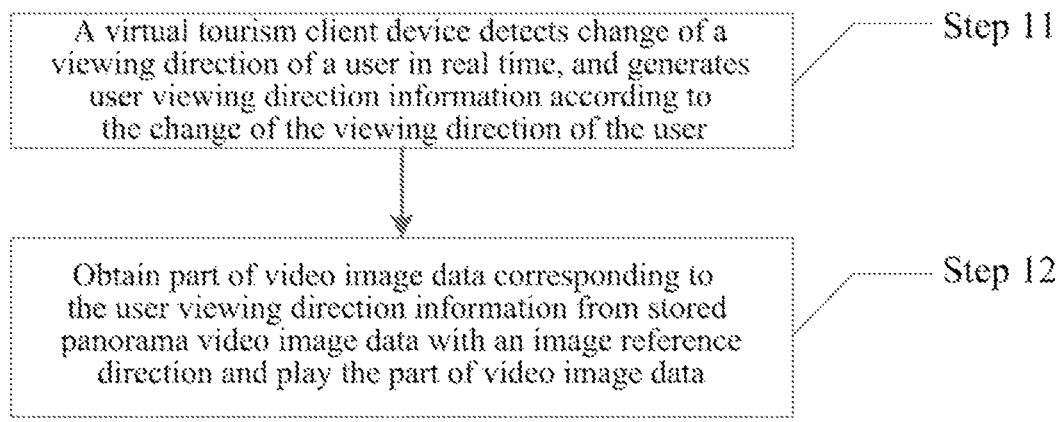
FIG. 1 is a flowchart of a virtual tourism method according to an embodiment of the present disclosure.

The present disclosure describes multiple embodiments, but the description is illustrative rather than limiting, and for those of ordinary skill in the art, there may be more embodiments and implementation solutions within the scope of embodiments described in the present disclosure. Although many possible combinations of features are shown in the drawings, and have been discussed in specific embodiments, many other combinations of the disclosed features are also possible. Unless specifically limited, any feature or element of any embodiment may be used in combination with or in place of any other feature or element of any other embodiment.

The present disclosure includes and contemplates combinations of features and elements known to those of ordinary skilled in the art. The disclosed embodiments, features and elements of the present disclosure may be combined with any regular features or elements to form a unique solution of the present disclosure as defined by the claims. Any features or elements of any embodiments may also be combined with features or elements from another technical solution to form another unique disclosed solution defined by the claims. Therefore, it should be understood that any of the features shown and discussed in the present disclosure may be implemented individually or in any suitable combination. Therefore, embodiments are not limited except by the limitations according to the appended claims and their equivalents. In addition, various modifications and variations may be made within the scope of protection of the appended claims.

In addition, when describing representative embodiments, the specification may have presented methods and/or processes as a specific sequence of steps. However, to the extent that the method or process does not depend on the specific order of steps described herein, the method or process should not be limited to the specific order of steps described. As those of ordinary skilled in the art will understand, other sequences of steps may also be possible. Therefore, the specific order of steps set forth in the specification should not be interpreted as limiting the claims. In addition, the claims for the method and/or process should not be limited to performing their steps in the written order, and those of skilled in the art may readily understand that these orders may vary and still remain within the spirit and scope of the embodiments of the present disclosure.

Unless otherwise defined, technical terms or scientific terms used and disclosed in the embodiments of the present disclosure shall possess the general meaning understood by those with general skills in the field to which the present disclosure pertains. The words "first", "second" and the like used in the embodiments of the present disclosure do not indicate any order, quantity or importance, but are only used for distinguishing different components. The word "including", "containing", or the like means that an element or an article appearing before the word covers elements or articles listed after the word and their equivalents and does not exclude other elements or articles. The word "connected", "connected with", or the like is not limited to physical or mechanical connections, but may include electrical connections, either directly or indirectly.

An embodiment provides a virtual tourism method, as shown in FIG. 1, including the following steps 11 and 12.

In step 11, a virtual tourism client device (hereinafter referred to as a client device) detects a change of a user viewing direction in real time, and generates user viewing direction information according to the change of the viewing direction, wherein the change of the viewing direction is a change of a current viewing direction of the user with respect to a reference viewing direction.

The reference viewing direction is a viewing direction when a head is in a reference state. The reference state includes a head rotation angle reference, a head pitch angle reference, and a head swing angle reference, wherein: the head rotation angle reference refers to a front when a head does not rotate left or right, for example, the head rotation angle reference is a vertical plane perpendicular to a horizontal plane when facing the front; the head pitch angle reference refers to a horizontal plane where a line of sight is when the head is not tilted up or down, for example, the head pitch angle reference may be the horizontal plane when facing the front; the head swing angle reference refers to the horizontal plane where the line of sight is located when the head is not tilted left or right, and the swing angle reference may be a vertical plane perpendicular to the line of sight.

In step 12, a part of video image data corresponding to the user viewing direction information is obtained from panoramic video image data with the image reference direction stored by a virtual tourism server-side device (hereinafter referred to as a server-side device) and is played.

By playing corresponding video image data according to the viewing direction information of the user, the video image will change in real time with the viewing direction and angle of the user, such as looking up, looking down, turning left or right, etc., which may produce a stronger sense of immersion and presence and enable the user to create a real sense of travel. In addition, because the panoramic video images are stored in the server-side device, they may be used by different users simultaneously, thus improving a utilization rate of resources and avoiding waste of resources.

In the embodiment, the client device sends the generated user viewing direction information to the server-side device. For example, the user viewing direction information generated by the client device is a first angle difference between a current user viewing direction and the reference viewing direction, then the server-side device receives the information and converts the first angle difference into a second angle difference between the current viewing direction of the user and the image reference direction of the panoramic video image (if the reference viewing direction is not redefined, the reference viewing direction is the same as the image reference direction), determines the part of the video image data corresponding to the user viewing direction according to the second angle difference, and transmits the part of the video image data corresponding to the user viewing direction to the client device for playing. The client device does not need to store huge panoramic video image data or perform data calculation. In one aspect, hardware requirements for client device may be reduced, and in another aspect, data update and management of the server-side is convenient.

Figure 2:
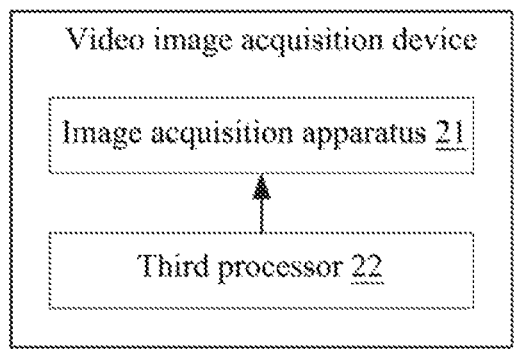
FIG. 2 is a schematic diagram of a structure of a video image acquisition device according to an embodiment of the present disclosure.

The panoramic video image data pre-stored by the server-side device is acquired by a video image acquisition device. As shown in FIG. 2, the video image acquisition device includes an image acquisition apparatus 21 and a third processor 22 that may calibrate an image reference direction.

The image acquisition apparatus 21 is configured to acquire panoramic video image data.

The third processor 22 is configured to mark an image reference direction of the panoramic video image in the acquired panoramic video image data according to a movement direction of the image acquisition apparatus while the image acquisition apparatus (such as a camera) acquires the panoramic video image data.

The panoramic video image data may be acquired by the image acquisition apparatus provided on a carrier (i.e., a carrier such as a vehicle). For example, an existing camera may be used as the image acquisition apparatus, and functions of the third processor may be configured for the camera.

The panoramic video image pre-acquired by the camera (for example, a camera with a panoramic function) may be a planar image or may be a stereoscopic image. The camera which acquires the panoramic video image may have a plurality of camera units, and the images acquired by the plurality of camera units may be synthesized into one panoramic video image through an existing synthesis algorithm.

The acquired panoramic video image may be marked with the image reference direction at the same time of shooting, or may be marked after shooting. Marking may be done in units of the panoramic image per frame. A way of marking is marking directly, for example, direction marking data may be added behind pixel data (e.g., gray scale data) at an image reference direction position in the panoramic image data. Another way of marking is marking indirectly, for example, a group of image reference direction data is separately stored, including position data corresponding to a part of image pixels of the panoramic image data and direction marking data corresponding to the position.

Figure 3:
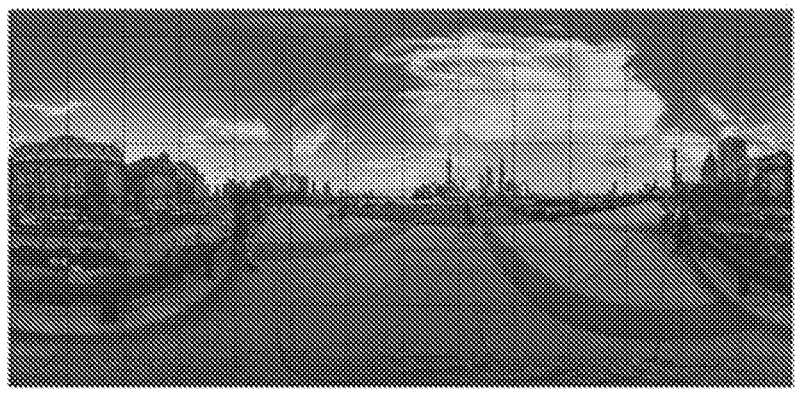
FIG. 3 is a schematic diagram of a panoramic image according to an embodiment of the present disclosure.

The marking data may include, for example, a central mark, and may also include, but is not limited to, at least one of the following directional marks: an upward mark, a downward mark, and the like. For example, the position of the panoramic image corresponding to the right ahead is marked as a central mark or referred to as an image reference direction. The position above a central position of the panoramic image is marked (for example, looking up 30 or 45 degrees) as an upward mark (30 or 45 degrees upward corresponds to the central position of the image seen when the head is tilted upward by a corresponding angle, corresponding to a latitude line). The position below the central position of the panoramic image is marked (for example, looking down at 30 or 45 degrees) as a downward mark (30 or 45 degrees downward corresponds to the central position of the image seen when the head is tilted downward by a corresponding angle, corresponding to a latitude line). In another example embodiment, an angle marking of the corresponding longitude line in the circumferential direction may be performed with the image reference direction as a reference (corresponding to a starting direction) and the camera as a central (e.g., the left rotation 45 degrees or 90 degrees and the right rotation 45 degrees or 90 degrees are selectively added). The above ways of marking the reference position are only examples. In other embodiments, marking may be performed according to a camera orientation of an acquired image, for example, a central of the image acquired by the camera unit directly in front of the camera may be marked as the reference viewing direction. In other example embodiment, a panoramic image may be marked by gridding warp and weft, as shown in FIG. 3. Those of skilled in the art may adopt other ways of marking the reference position, and the present disclosure is not limited thereto. Marking a plurality of reference positions may facilitate subsequent calculation and determination of images to be displayed.

The third processor 22 may be one processor or a general designation of a plurality of processing devices. For example, the third processor 22 may be a Central Processing Unit (CPU), or may be a Graphics Processing Unit (GPU), or may be an Application Specific Integrated Circuit (ASIC), or one or more integrated circuits configured to implement embodiments of the present disclosure, such as one or more Digital Signal Processors (DSP), or one or more Field Programmable Gate Arrays (FPGA), or other programmable logic devices, discrete gates or transistor logic devices, discrete hardware components.

In an example embodiment, panoramic video images may be shot and stored separately at different time periods of one day. During a virtual tourism, the images shot in the corresponding time period may be selected for display according to a travel time period independently selected by the user or the time when the user is currently performing the virtual tourism, thus further improving a user experience. Panoramic video images of different time periods may be stored at different storage positions of the server-side device. Before the server-side device selects a corresponding part of video image data from the panoramic video image data according to the user viewing direction information sent by the client device to send to the client device, the server-side device may first determine whether the user has set a travel time period, and if so, the server-side device may search corresponding panoramic video image data according to the travel time period set by the user, a part of the video image data corresponding to the viewing direction of the user is selected and sent to the client device; if not, corresponding to the default current time period, the corresponding panoramic video image data is searched according to the time period to which the current time belongs, and a part of the video image data corresponding to the viewing direction of the user is selected and sent to the client device.

Figure 4:
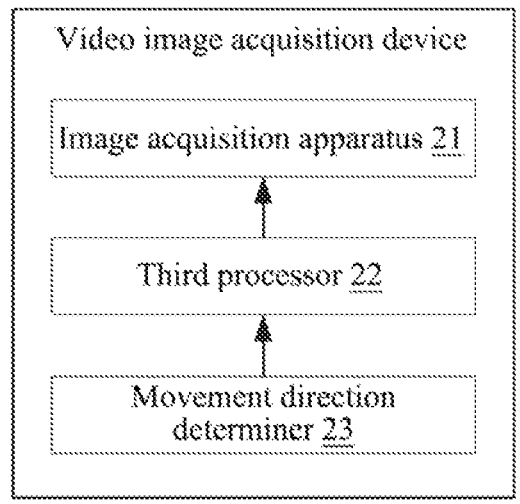
FIG. 4 is a schematic diagram of a structure of a video image acquisition device with a movement direction determiner according to an embodiment of the present disclosure.

In an example embodiment, the video image acquisition apparatus may further include a movement direction determiner 23, as shown in FIG. 4, which may be configured to determine a movement direction of a carrier loaded with the image acquisition apparatus.

The third processor 22 may be configured to take a movement direction determined by the movement direction determiner as an image reference direction (the image reference direction corresponds to a position of the image, the shooting direction of the camera corresponding to the image of the position being consistent with the movement direction) and mark it in the in the panoramic video image data.

The movement direction determiner may be implemented by, for example, a gyroscope. The forward movement direction of the carrier is determined by the gyroscope, and the corresponding direction of the image space corresponding to the movement direction is set as the image reference direction.

Figure 5:
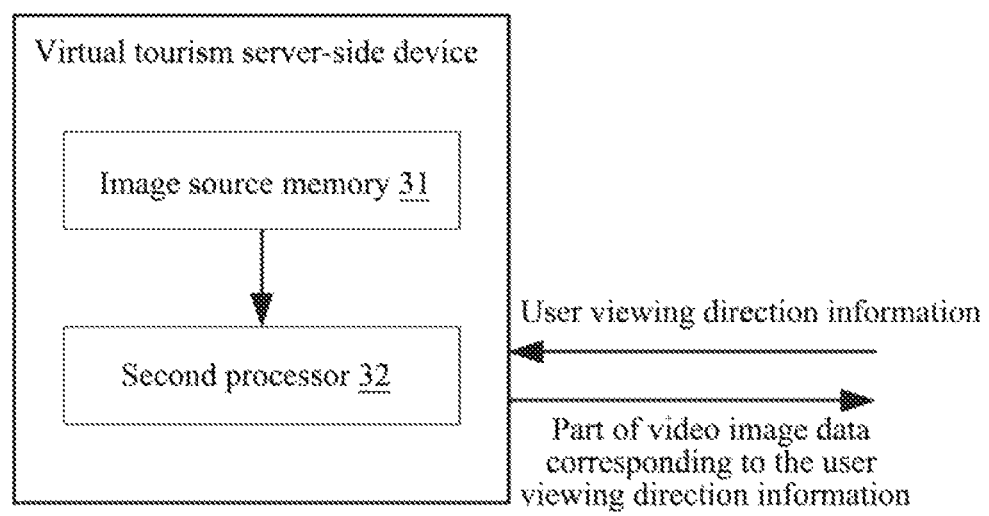
FIG. 5 is a schematic diagram of a structure of a virtual tourism server-side device according to an embodiment of the present disclosure.

In an embodiment of the present disclosure, the server-side device includes an image source memory 31 and a second processor 32, as shown in FIG. 5.

The image source memory 31 is configured to store panoramic video image data of a tourism scene.

The second processor 32 is configured to select a corresponding part of video image data from the panoramic video image data according to user viewing direction information sent by a virtual tourism client device and send the part of the video image data to the virtual tourism client device for playing by the virtual tourism client device.

The image source memory 31 may be a memory or a general designation of a plurality of memory devices. The image source memory 31 may include random access memory (RAM) or non-volatile memory, such as disk memory, Flash memory.

The second processor 32 may be one processor or a general designation of a plurality of processing devices. For example, the second processor 32 may be a Central Processing Unit (CPU), or may be a Graphics Processing Unit (GPU), or may be an Application Specific Integrated Circuit (ASIC), or one or more integrated circuits configured to implement embodiments of the present disclosure, such as one or more Digital Signal Processors (DSP), or one or more Field Programmable Gate Arrays (FPGA), or other programmable logic devices, discrete gates or transistor logic devices, discrete hardware components.

The server-side device in the embodiment may realize simultaneous use of multiple users by uniformly storing panoramic video images, improve a utilization rate of resources, and avoid waste of resources. In addition, the server-side device calculates and selects a part of the video image data corresponding to the viewing direction of the user, which may reduce the hardware requirements of the client device and facilitate the update and management of the server-side data in another aspect.

Figure 6:
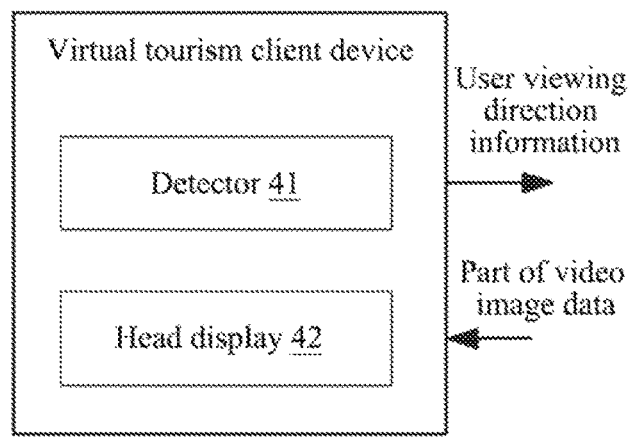
FIG. 6 is a schematic diagram of a structure of a virtual tourism client device according to an embodiment of the present disclosure.

In an embodiment of the present disclosure, the client device includes a detector 41 and a head display 42, as shown in FIG. 6.

The detector 41 is configured to detect change in a viewing direction of a user in real time and generate user viewing direction information according to the change in the viewing direction, wherein the change in the viewing direction is change in a current viewing direction of the user with respect to a reference viewing direction.

The head display 42 is configured to obtain and play a part of the video image data corresponding to the user viewing direction information in panoramic video image data with the image reference direction.

According to the client device of an embodiment of the present disclosure, the change of the viewing direction of the user is detected in real time, the real-time viewing requirement of the user is confirmed, and the part of the video image corresponding to the current viewing direction of the user, namely the part of the panoramic video image, is selected and played from the panoramic video image data according to the viewing direction information of the user, so that the user may see different scenes. Since the played image changes in real time with viewing directions and angles of the user's head up, head down, left and right turning, etc., a stronger sense of immersion and presence may be generated to make the user feel like traveling on a spot.

In addition, when the panoramic video image data is stored in the server, different users may choose to play different parts according to their own needs, so that a group of panoramic video image data may meet the needs of different users, the number of service users may greatly increase, and waste of resources may be avoided.

Figure 7:
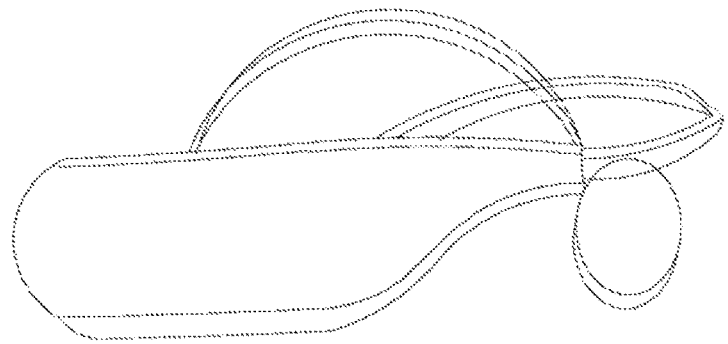
FIG. 7 is an example diagram of a head display device according to an embodiment of the present disclosure.

The head display of the embodiment may be shown in FIG. 7, for example.

Figure 8:
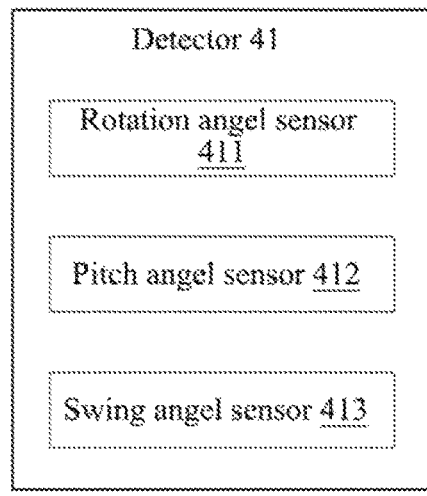
FIG. 8 is a schematic diagram of a structure of a detector of a virtual tourism client device according to an embodiment of the present disclosure.

As shown in FIG. 8, the detector 41 includes a rotation angle sensor 411 configured to sense head rotation, a pitch angle sensor 412 configured to sense head pitch angle change, and a swing angle sensor 413 configured to sense head swing. Head rotation refers to the head rotation to the left or right with respect to the face of the reference viewing direction (face orientation in normal forward viewing), and the head rotation angle may be a deflection angle of the head with respect to the reference viewing direction; head pitching refers to upward (bottom) or downward (top) head movement with respect to a head pitch angle reference plane (such as a horizontal plane), and the head pitch angle may be an offset angle of the head with respect to the head pitch angle reference plane; head swing refers to head movement with the face tilted leftward (near the left shoulder) or rightward (near the right shoulder) with respect to the head swing angle reference plane (such as a vertical plane extending forwards and backwards), the head swing angle may be the offset angle of the head with respect to the head swing angle reference plane. The above sensor may be implemented by, but is not limited to, a gyroscope, such as a 9-axis or 10-axis attitude gyroscope, which may have a transceiver that transmits user viewing direction information to the head display, or may feedback the user viewing direction information to the head display according to a request of the head display. Since the head movement of the user may be a compound multi-directional movement, therefore the obtained user viewing direction information includes at least one piece of the following information: rotation angle, pitch angle and swing angle.

In an example embodiment, the detector 41 may include a head image obtaining device configured to obtain a head image, and the client device may further include a head deviation calculator configured to calculate a head deflection angle according to the head image obtained by the head image obtaining device by using a computer vision technology.

In another example embodiment, the detector 41 may include a head image obtaining device configured to obtain a head image, send the head image to a server-side device, and receive head deflection angle information sent by the server-side device. In this example, the server-side device includes a head deviation calculator which may be located in the second processor and configured to calculate a head deflection angle according to the head image sent by the client device by using a computer vision technology, and send the head deflection angle information to the detector of the client device.

In the above technical solutions, calculating the head deflection angle according to the head image obtained by the head image obtaining device by using a computer vision technology may include performing target tracking by using the computer vision technology, and calculating the head deflection angle according to an offset displacement of the target tracked. The computer vision technology may be, for example, a target tracking algorithm based on twin networks (SiamFC), or a target tracking algorithm based on deep learning, or other target tracking algorithms.

For example, coordinates of a target feature P in a first frame are (x1, y1), and coordinates of the target feature P in a second frame are (x2, y2), then a rotation angle of the user's head in the horizontal direction can be calculated according to a horizontal displacement of the target feature P, that is, the displacement in the horizontal direction (x2−x1), and a pitch angle of the user's head in the vertical direction can be calculated according to a vertical displacement of the target feature P, that is, the displacement in the vertical direction (y2−y1). A swing angle of the user's head can be obtained according to an included angle between a connecting line of two target features in the first frame of image and a connecting line of the two target features in the second frame of image. Taking the two target features being eyes as an example, positions of the eyes are respectively determined in the first frame of image and the second frame of image, the included angle between a connecting line of the eyes in the first frame of image and a connecting line of the eyes in the second frame of image is calculated, and the included angle is the swing angle of the user's head. The first frame and the second frame may be two adjacent frames or may be two frames spaced by a number of frames. Of course, the closer the two frames are, the closer the calculated angle is to an actual moving angle, but the calculation amount is large. If the two frames are far apart, the movement of the target feature may cause inaccuracy in the calculated angle. Therefore, in another example embodiment, motion prediction of the target feature may be performed by using a motion estimation algorithm. Assuming that a predicted horizontal displacement is x0, and a predicted vertical displacement is y0, when calculating the rotation angle and the pitch angle, the rotation angle is calculated according to the horizontal displacement and the predicted horizontal displacement of the target feature P (x2−x1−x0), and the rotation angle is calculated according to the vertical displacement and the predicted vertical displacement of the target feature P (y2−y1−y0). The target feature may be a face, or a human eye, etc., in a head image.

Figure 9:
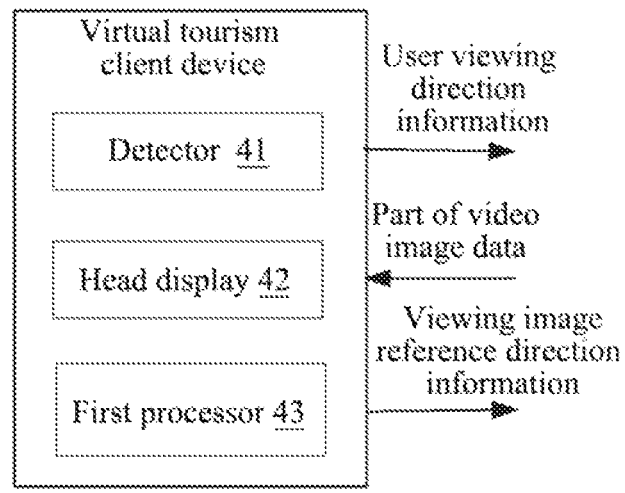
FIG. 9 is a schematic diagram of a structure of a virtual tourism client device with a first processor according to an embodiment of the present disclosure.

In an example embodiment, as shown in FIG. 9, the client device may further include a first processor 43 that may define a viewing image reference direction, is configured to define a viewing image reference direction corresponding to the reference viewing direction for a user, the viewing image reference direction being the same as the image reference direction of panoramic video image or having an angle difference with the image reference direction of the panoramic video image.

Through the first processor 43, the user may set the direction offset by an angle with respect to the image reference direction as the viewing image reference direction, for example, the user sets the direction in which the image reference direction is rotated 90 degrees to the left (or may be 45 degrees, etc.) as the viewing image reference direction, so the user does not have to turn his head to the left all the time, and the image in the corresponding direction when the head is rotated 90 degrees to the left with respect to the undefined reference viewing direction may still be seen in front (corresponding to the reference viewing direction). For example, when the user does not set the reference direction for viewing the image, it is equivalent to that the user is sitting on a vehicle directly in front, and when the user sets the reference direction for viewing the image as left, it is equivalent to that the user is sitting on the seat facing the left of the vehicle. The first processor 43 may include a key through which the user can perform adjustment. For example, the user may input reference direction definition information (viewing image reference direction information) corresponding to a left rotation of +90 degrees, so that the user may still see an image corresponding to a left rotation of 90 degrees with respect to the reference viewing direction when the viewing image reference direction is not defined without rotating, i.e., the viewing image reference direction has a 90 degrees difference with the image reference direction of the panoramic video image. The manner in which the user inputs the reference direction definition information (viewing image reference direction information) corresponding to +90 degrees rotation to the left through the first processor 43 is not limited, and a numerical value may be input directly, or it may be realized by continuously pressing a button or clicking a button several times, etc. When the user does not make the setting, the default viewing image reference direction is the same as the image reference direction of the panoramic video image. The first processor 43 may be a processor having a user interaction function, for example, the first processor 43 may be a Central Processing Unit or may be an Application Specific Integrated Circuit (ASIC), or may be one or more integrated circuits configured to implement embodiments of the present disclosure, such as one or more Digital Signal Processors (DSP), or one or more Field Programmable Gate Arrays (FPGA), or other programmable logic devices, discrete gates or transistor logic devices, discrete hardware components.

In an example embodiment of the virtual tourism server-side device, the second processor 32 is further configured to receive a head image sent by the virtual tourism client device, calculate a head deflection angle according to the head image by using a computer vision technology, and send the calculated head deflection angle to the virtual tourism client device.

Illustratively, the second processor 32 may obtain a same target feature in two frames of images by using a target tracking algorithm, calculate a head rotation angle according to a horizontal displacement of the target feature, calculate a head pitch angle according to a vertical displacement of the target feature, and obtain a head swing angle according to an included angle between a connecting line of two target features in a first frame of image and a connecting line of the two target features in a second frame of image.

Alternatively, the second processor 32 may obtain a same target feature in two frames of images by using a target tracking algorithm, perform motion prediction of the target feature, calculate a head rotation angle according to a horizontal displacement and a predicted horizontal displacement of the target feature, calculate a head pitch angle according to a vertical displacement and a predicted vertical displacement of the target feature, and obtain a head swing angle according to an included angle between a connecting line of two target features in a first frame of image and a connecting line of the two target features in a second frame of image.

In an example embodiment of the virtual tourism method, in addition to the aforementioned steps 11 and 12, the method may further include the following steps: receiving a user-defined viewing image reference direction corresponding to the reference viewing direction; in the above step 12, based on the viewing image reference direction and the user viewing direction information sent by the virtual tourism client device, a corresponding part of video image data is selected from the panoramic video image data and sent to the virtual tourism client device.

The reference viewing direction (a first reference direction) and the user viewing direction described in the embodiment are both a line-of-sight direction or a face direction in real space, and the user viewing direction information is change information of the current viewing direction (when the head rotates and pitches are adjusted) with respect to the reference viewing direction (when the head does not rotate and does not pitch). The image reference direction (a second reference direction) is a direction in an image space, which is determined by the movement direction of the carrier and the camera when the image is shot. In the case where the user does not set the image reference direction for viewing the image, the second reference direction in the image space is generally consistent with the first reference direction in the real space (except in the case where the user's head leans against a headrest of the seat and the road inclines when the image is shot). The user may set an image reference direction (a third reference direction) for viewing an image, which reflects that mutual relationship between the reference viewing direction expected by the user in the real space and the second reference direction after mapping to the image space (the default is the same, and can be set at an angle), since the first reference direction corresponds to the third reference direction, the reference direction expected by the user may be mapped to the image space.

The first processor 43 of the client device transmits the user-defined viewing image reference direction definition information to the server-side device. Correspondingly, the second processor 32 of the server-side device is further configured to receive the viewing image reference direction information sent by the client device, wherein the viewing image reference direction information is used to represent the angle difference between the user-defined viewing image reference direction and the image reference direction of the panoramic video image, and the second processor 32 is configured to select a corresponding part of video image data from the panoramic video image data and send it to the client device based on the viewing image reference direction in combination with the user viewing direction information sent by the virtual tourism client device.

For example, the user sets the viewing image reference direction to rotate 90 degrees to right with respect to the image reference direction in the image space. The second processor 32 records the viewing image reference direction, and after receiving the user viewing direction information, reads a part of the video image data corresponding to the direction from the panoramic video image data based on the user viewing direction information using the direction obtained by rotating 90 degrees to the right according to the image reference direction as a reference and transmits the part of the video image data to the client device.

Figure 10:
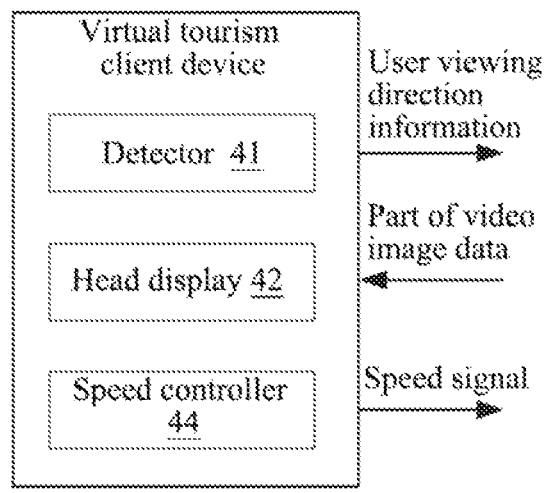
FIG. 10 is a schematic diagram of a structure of a virtual tourism client device with a speed controller according to an embodiment of the present disclosure.

In an example embodiment, as shown in FIG. 10, the virtual tourism client device further includes a speed controller 44 configured to send out a speed signal based on a user control (e.g., a user operation) to control a speed at which a head display in the client device plays video images. The speed controller may be, for example, a speed button or a pedal speed control mechanism (similar to an accelerator pedal of an automobile accelerator) or a remote control handle, or other existing devices that may send speed signals may be used. The speed controller may further include a transceiver, connecting with the speed button or the pedal speed control mechanism or remote control handle, the transceiver may be configured to convert signals emitted by the speed button or the pedal speed control mechanism or the remote control handle into speed signals, and the transceiver may be integrated in the speed button or the pedal speed control mechanism or the remote control handle.

In an example embodiment, the virtual tourism method further includes the following steps: controlling a video playing speed according to a speed signal generated by a speed controller controlled by a user, and determining whether the speed indicated by the speed signal exceeding a preset speed threshold.

If the speed indicated by the speed signal exceeds a preset speed threshold, when a part of the video image data is obtained from the panoramic video image data in the step 12, video image data is extracted in a periodical interval of a preset number of frames and the video image data is sent to the client device to control the speed at which the client device plays the video image.

Correspondingly, the second processor 32 of the server-side device is further configured to receive the speed signal sent by the client device and when determining that the speed indicated by the speed signal exceeds a preset speed threshold, that is, in response to the speed indicated by the speed signal exceeding the preset speed threshold, when selecting a part of the video image data from the panoramic video image, extract video image data in a periodical interval of a preset number of frames and send the video image data to the client device to control the speed at which the client device plays the video image.

There may be multiple preset speed thresholds, corresponding to different preset frames. The larger the preset speed threshold, the higher the speed is, and the more the corresponding preset frames are. On the contrary, the smaller the preset speed threshold, the lower the speed is, and the less the corresponding preset frames are.

By extracting video image data at intervals for the client device to play, the user may have a sense of speed and a better experience. And the interval extraction of a part of video image data by the server-side device may reduce the amount of data transmission between the server-side device and client device.

Figure 11:
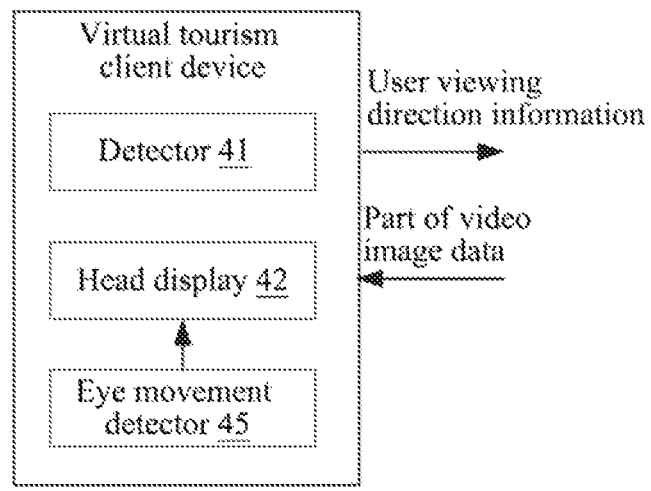
FIG. 11 is a schematic diagram of a structure of a virtual tourism client device with an eye movement detector according to an embodiment of the present disclosure.

In an example embodiment, as shown in FIG. 11, the client device further includes an eye movement detector 45 configured to determine a gaze area of human eyes.

The head display 42 is further configured to enlarge and display a video image corresponding to an gaze area of human eyes; and/or adjust a first resolution of the video image corresponding to the gaze area of human eyes and a second resolution of the video image outside the gaze area of human eyes to make the first resolution higher than the second resolution.

The eye movement detector 45 may be, for example, an eye movement meter.

In an example embodiment, the head display 42 may send information of the gaze area of human eyes determined by the eye movement detector 45 to the server-side device. The server-side device, when selecting a part of video image data corresponding to user viewing direction information from panoramic video image data with an image reference direction, performs super resolution processing on a video image corresponding to the gaze area of human eyes in the part of the video image data according to the information of the gaze area of human eyes, and sends the part of the video image data after the processing to the client device for display by the head display 42 of the client device. The part of the video image data after the processing includes the gaze area of human eyes and a non-gaze area of human eyes (i.e., the area other than the gaze area of human eyes), a resolution of the gaze area of human eyes is a first resolution, a resolution of the non-gaze area of human eyes is a second resolution, and the first resolution is higher than the second resolution.

In another example embodiment, the head display 42 may, after obtaining the part of the video image data corresponding to the user viewing direction information from the panoramic video image data with the image reference direction, perform super resolution processing on a video image corresponding to the gaze area of human eyes in the part of the video image data according to the gaze area of human eyes determined by the eye movement detector 45, and display the part of the video image data after the processing. The part of the video image data after the processing includes the gaze area of human eyes and a non-gaze area of human eyes (i.e., the area other than the gaze area of human eyes), a resolution of the gaze area of human eyes is a first resolution, a resolution of the non-gaze area of human eyes is a second resolution, and the first resolution is higher than the second resolution.

The super resolution processing may employ a super resolution method based on image interpolation or may employ a super resolution method based on deep learning, which is not limited in the present application. The super resolution processing may be real-time processing, so that the user can get better experience.

In an example embodiment of the virtual tourism server-side device, the second processor 32 is further configured to receive information of a gaze area of human eyes sent by the virtual tourism client device, perform super resolution processing on a video image corresponding to the gaze area of human eyes in the selected part of video image data, and send the part of the video image data after the processing to the virtual tourism client device for display, the part of the video image data after the processing including the gaze area of human eyes and a non-gaze area of human eyes, and a first resolution of the gaze area of human eyes being higher than a second resolution of the non-gaze area of human eyes.

In an example embodiment of the virtual tourism method, in step 12, a video image corresponding to the gaze area of human eyes is enlarged and displayed according to the determined gaze area of human eyes, and/or the first resolution of the video image corresponding to the gaze area of human eyes and the second resolution of the video image outside the gaze area of human eyes are adjusted to make the first resolution higher than the second resolution. For example, in the step 12, super resolution processing is performed on a video image corresponding to the gaze area of human eyes in the part of the video image data, the part of the video image data after the processing includes the gaze area of human eyes and a non-gaze area of human eyes, and a first resolution of the gaze area of human eyes is higher than a second resolution of the non-gaze area of human eyes By adopting an eye movement detection technology, the gaze area of human eyes may be determined in real time. For example, when detecting that human eyes look at a place for a long time (for example, over a preset time period), that is, the gaze area of human eyes does not change within the preset time period, it can be understood that the user is interested in the part of the video image, and then the head display enlarges the video image corresponding to the gaze area of human eyes so that the user may more clearly observe scene details. When detecting that the human eyes no longer focus on this area, it exits a local amplification mode. At the same time, in order to give the user a better experience, an image resolution of the gaze area of human eyes may be improved, for example, the second processor may transmit a part of the video image corresponding to the gaze area of human eyes in a lossless compression mode to reduce distortion and data loss. For example, an original video image may be processed by an interpolation algorithm to obtain a higher resolution video image. The solution for improving the image resolution of the gaze area of human eyes may be implemented separately.

Figure 12:
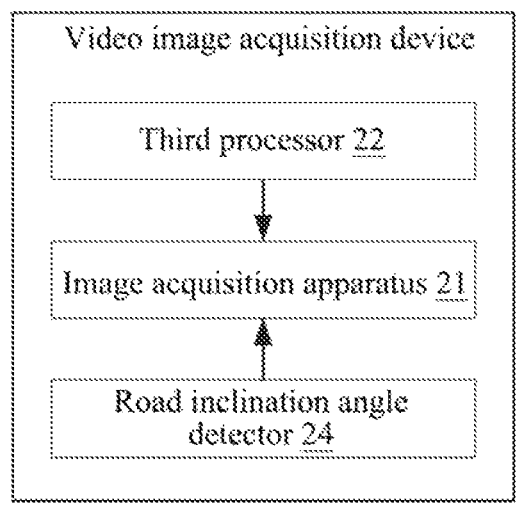
FIG. 12 is a schematic diagram of a structure of a video image acquisition device with a road inclination angle detector according to an embodiment of the present disclosure.

In an example embodiment, as shown in FIG. 12, the video image acquisition device further includes a road inclination angle detector 24, which is configured to detect an inclination angle (usually an inclination angle with respect to a movement direction) when the road on which a carrier carrying the video image acquisition device is driven is inclined, and mark the inclination angle in the panoramic video image data. The marking method may adopt the aforementioned direct marking method or indirect marking method, which will not be described here again. The road inclination angle detector may be, but is not limited to, a gyroscope, an inclination angle detector realized by geomagnetic field or gravity, or a 10-axis accelerometer to realize angle measurement. When detecting that there is an inclination angle on the road, the inclination angle information may be recorded in the panoramic video image data. The road inclination angle detector 24 may further include a fourth processor connected with the road inclination angle detector 24, the fourth processor may be configured to mark the inclination angle in the panoramic video image data, and the fourth processor may be integrated in the road inclination angle detector 24.

Figure 13:
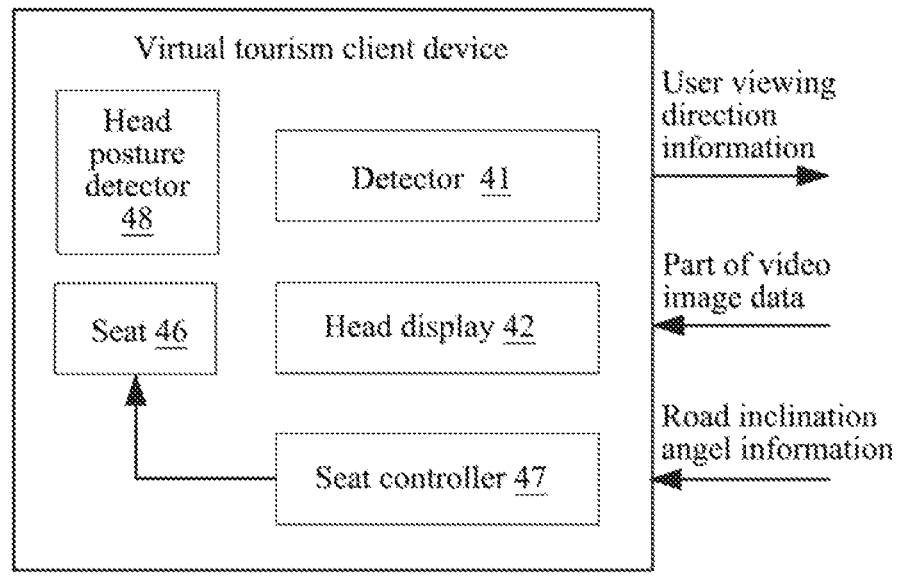
FIG. 13 is a schematic diagram of a structure of a virtual tourism client device with a seat controller and a head posture detector according to an embodiment of the present disclosure.
Figure 14:
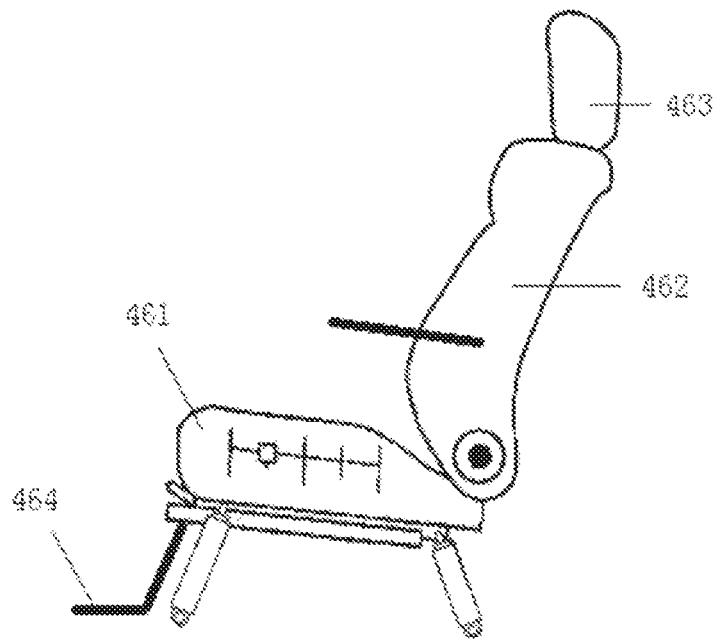
FIG. 14 is a schematic view of a seat according to an embodiment of the present disclosure.

Accordingly, as shown in FIG. 13, the client device further includes a seat 46 and a seat controller 47, the seat 46 includes a seat body 461, a backrest 462, a headrest 463, and a foot pedal 464 (as shown in FIG. 14) that may be kept relatively fixed, and the seat controller 47 is configured to adjust an inclination angle of the seat according to the inclination angle corresponding to road inclination angle information when the road inclination angle information is included in a part of the video image data obtained from the server-side device.

The seat body, backrest, headrest, pedal and other parts of the seat are relatively fixed, which may ensure that a person sitting on the seat can pitch and tilt overall at the same time without moving his feet, so as to better simulate a feeling of sightseeing in the car. In some embodiments, the backrest and headrest may be provided together.

The seat controller 47 is configured to adjust an overall inclination angle of the seat according to the road inclination angle. For example, when the inclination angle of the road is 15 degrees forward, the seat controller 47 may make the overall inclination angle of the seat the same as the inclination angle of the road, even if the seat is 15 degrees backward. The seat controller 47 may be implemented by, for example, a controller and a hydraulic cylinder (or hydraulic rod), wherein the controller is used to send a command to raise or lower the hydraulic cylinder (or hydraulic rod).

By adjusting the seat according to the inclination angle of the road, an immersion feeling of the user may be increased. In addition to the above-mentioned front-and-back adjustment, left-and-right adjustment may be performed in other embodiments in the same way as the front-and-back adjustment, and will not be repeated here.

In an example embodiment, the seat controller may include a plurality of power supports, both ends of which are hinged to a base (or ground) and the seat respectively, and hinge shafts at both ends may be perpendicular to each other.

In this way, not only the vehicle uphill and downhill, but also the vehicle left and right inclination may be simulated.

In an example embodiment, the client device may further include a head posture detector 48 (refer to FIG. 13), which has a function of detecting a user's head leaning state (whether leaning on a headrest) and generates leaning state information for indicating whether the user's head is in a leaning state, and the leaning state information is used for determining whether the user's current viewing direction needs to be corrected according to a road inclination angle corresponding to the road inclination angle information. For example, the head posture detector 48 may include a pressure sensor provided on the headrest, or may be a module composed of a camera and an image recognizer, and the image acquired by the camera is recognized by the image recognizer to determine whether the user leans against the headrest. The image recognizer may be, for example, a processor having an image recognition function.

When the head posture detector 48 detects that the user's head is in a leaning state, and the head display includes road inclination angle information in the obtained a part of video image data, and the seat controller adjusts the overall inclination angle of the seat according to the road inclination angle, the client device corrects the current viewing direction of the user according to the road inclination angle corresponding to the road inclination angle information.

In addition to correcting the current viewing direction of the user by the client device, the server device may correct the viewing direction of the user, and at this time, the client device sends the leaning state information to the server-side device. The leaning state information may be identification information for indicating whether the user's head is in the leaning state. The second processor 32 of the server-side device is configured to receive the leaning state information sent by the virtual tourism client device, and under a condition of the road inclination angle information being included in the panoramic video image data and the client device including a seat and a seat controller being capable of adjusting the seat according to the road inclination angle, when selecting a corresponding part of the video image data from the panoramic video image data according to the user viewing direction information sent by the virtual tourism client device, correct the current viewing direction of the user according to the road inclination angle corresponding to the road inclination angle information.

In an example embodiment of the virtual tourism method, the method further includes: adjusting the inclination angle of the seat according to the inclination angle corresponding to the road inclination angle information when the obtained a part of video image data includes the road inclination angle information.

In an example embodiment of the virtual tourism method, the method further includes: correcting the current viewing direction of the user according to the road inclination angle corresponding to the road inclination angle information when the user's head is in a leaning state, the obtained a part of video image data includes road inclination angle information, and the client device includes a seat and a seat controller capable of adjusting the seat according to the road inclination angle.

Correspondingly, the second processor 32 of the server-side device is further configured to correct the current viewing direction of the user according to the road inclination angle corresponding to the road inclination angle information when receiving the leaning state information indicating that the user's head is in the leaning state, determining that the panoramic video image data includes road inclination angle information, and the client device including a seat and a seat controller capable of adjusting the seat according to the road inclination angle; or, the second processor 32 of the server-side device is further configured to send the road inclination angle information to the client device to make the client device correct the current viewing direction of the user when determining that the panoramic video image data includes the road inclination angle information (i.e., in response to the panoramic video image data including the road inclination angle information).

When the following correction conditions are met: the user's head is in a leaning state, the panoramic video image data includes the road inclination angle information (optionally, the condition may be set such that the road inclination angle corresponding to the road inclination angle information is larger than a preset angle threshold), and when the seat controller in the client device adjusts the inclination angle of the seat according to the inclination angle, if the reference viewing direction (the first reference direction) in the real space is unchanged, then the detector of the client device may mistake the change of the user's head with the angle change of the seat inclination for the change of the user viewing direction. Taking the road as an uphill slope and the inclination angle 30 degrees as an example, when the seat inclines upwards to 30 degrees and the user's head leans against the headrest, the horizontal direction of line-of-sight of human eyes also inclines upwards to 30 degrees correspondingly. If the reference viewing direction is still the original horizontal plane (e.g., 0 degree), the detector will consider the upward inclination of 30 degrees as the change of the user viewing direction and send the corresponding user viewing direction information to the server device. However, since the image reference direction (the second reference direction) in the panoramic video image data in the server device is the movement direction of the image acquisition apparatus, that is, the upward inclination of 30 degrees. Therefore, when the second processor in the server device selects a part of the video image data, it will send a part of the video image data around the position inclined upwards to 30 degrees (user viewing direction change angle) with the image reference direction (the second reference direction) as the reference to the client device. As can be seen from the above process, when the road inclines, the user leans against the headrest and the user inclines correspondingly with the seat, the error in the user's viewing direction is caused due to the invariance of the reference viewing direction. Therefore, when the correction conditions are met, this part of the error may be corrected. When the correction conditions are not satisfied, no correction is made, or the correction angle is 0. The correction method is to subtract the road inclination angle from the change angle of the current user's viewing direction. If the road inclines upward (uphill), the inclination angle of the road is positive; if the road inclines downward (downhill), the road inclination angle is negative.

Under the condition that the correction conditions are met, the method and the device automatically correct the current viewing direction of the user, thereby effectively avoiding the problem of deviation and bringing better virtual tourism experience to the user.

An embodiment of the present disclosure also provides a virtual tourism system including the client device and the server-side device. In an example embodiment, the virtual tourism system may include the aforementioned video image acquisition device.

By adopt the method, the device and the system of the embodiment, when a user performs a virtual tourism, information such as a viewing direction and a viewing angle of the user is detected in real time, a real-time view requirement of the user is confirmed, and different parts of the panoramic image are selected to be played according to the current viewing direction information of the user. The played image will change in real time with the viewing direction and angle of the user's head up, head down, left and right turning, etc., so that a stronger sense of immersion and presence may be generated to make the user feel like traveling on a spot.

The client device and the server-side device may be two relatively independent devices connected through a communication system. For example, in this embodiment, the panoramic video image is stored in a cloud server-side device, the client device sends viewing direction information to the cloud server, the cloud server calculates the image to be displayed, and transmits the image to be displayed to the client device. Through the cloud server to complete the distribution of the image, using an original panoramic image data, multiple users may simultaneously perform virtual tourism, and may adapt to different viewing orientation requirements of different users.

In other embodiments, the second processor of the server-side device may be disposed on the client device, and the above-mentioned computing functions may be implemented by the client device, or both the second processor and the memory of the server-side device may be disposed on the client device. If the second processor is disposed on the client device, the judgment or processing function of the client device may be executed by the second processor. For example, by installing an application program for virtual tourism in a mobile terminal, a panoramic video image of a scenic spot is downloaded from a cloud server through the application program, a viewing direction and angle measured by the client device is received by the mobile terminal, an image to be displayed is calculated and determined, and the image to be displayed is sent to the head display. When the mobile terminal determines that a correction condition is satisfied, a current viewing direction of the user is corrected by the mobile terminal.

An embodiment pf the present disclosure further provides a non-transitory computer-readable storage medium, which stores computer-executable instructions, and the computer-executable instructions are used to execute the virtual tourism method of any of the embodiments of the virtual tourism method provided in the present disclosure.

Those of ordinary skill in the art will understand that all or some of the steps, systems, and functional modules/units in the apparatuses disclosed above may be implemented as software, firmware, hardware, and appropriate combinations thereof. In hardware implementations, the division between functional modules/units mentioned in the above description does not necessarily correspond to the division of physical components. For example, a physical component may have multiple functions, or a function or step may be performed by several physical components in cooperation. Some or all of the components may be implemented as software executed by a processor, such as a digital signal processor or a microprocessor, or as hardware, or as an integrated circuit, such as an application specific integrated circuit. Such software may be distributed on non-transitory computer readable storage medium including volatile or non-volatile, removable or non-removable medium implemented in any method or technology for storing information such as computer readable instructions, data structures, program modules or other data. Non-transitory computer readable storage medium include, for example, but are not limited to, RAM, ROM, EEPROM, flash memory or other memory technologies, CD-ROM, digital versatile disk (DVD) or other optical disk storage, magnetic cassettes, magnetic tapes, magnetic disk storage or other magnetic storage apparatuses, or any other medium that can be used to store desired information and can be accessed by a computer.

Although embodiments of the present disclosure are described in the above, the above embodiments are described only for better understanding, rather than restricting the present disclosure. Any person skilled in the art can make any modifications and variations in modes and details of implementation without departing from the spirit and scope of the present disclosure. However, the protection scope of the present disclosure shall be determined by the scope as defined in the claims.

The invention claimed is:

1. A virtual tourism client device, comprising a detector and a head display, wherein:
   the detector is configured to detect a change of a viewing direction of a user in real time and generate viewing direction information of the user according to the change of the viewing direction, wherein the change of the viewing direction is a change of a current viewing direction of the user with respect to a reference viewing direction;
   the head display is configured to obtain a part of video image data corresponding to the viewing direction information of the user from panoramic video image data with an image reference direction and play the part of the video image data;
   the detector comprises a head image obtaining device configured to obtain a head image, and the virtual tourism client device further comprises a head deviation calculator configured to calculate a head deflection angle according to the head image obtained by the head image obtaining device by using a computer vision technology;
   the head deviation calculator being configured to calculate the head deflection angle according to the head image obtained by the head image obtaining device by using the computer vision technology comprises:
   the head deviation calculator being configured to: obtain a same target feature in two frames of images by using a target tracking algorithm, calculate a head rotation angle according to a horizontal displacement of the target feature, calculate a head pitch angle according to a vertical displacement of the target feature, and obtain a head swing angle according to an included angle between a connecting line of two target features in a first frame of image and a connecting line of the two target features in a second frame of image; or
   the head deviation calculator being configured to: obtain a same target feature in two frames of images by using a target tracking algorithm, perform motion prediction of the target feature, calculate a head rotation angle according to a horizontal displacement and a predicted horizontal displacement of the target feature, calculate a head pitch angle according to a vertical displacement and a predicted vertical displacement of the target feature, and obtain a head swing angle according to an included angle between a connecting line of two target features in a first frame of image and a connecting line of the two target features in a second frame of image.

2. The virtual tourism client device according to claim 1, further comprising a first processor, configured to define a viewing image reference direction corresponding to the reference viewing direction for a user, the viewing image reference direction being the same as the image reference direction of the panoramic video image or having an angle difference with the image reference direction of the panoramic video image.

3. The virtual tourism client device according to claim 1, wherein the virtual tourism client device further comprises a speed controller, configured to send out a speed signal based on a user control to control a speed at which the head display plays video images.

4. The virtual tourism client device according to claim 1, further comprising an eye movement detector configured to determine a gaze area of human eyes;
 wherein the head display is further configured to:
  send information of the gaze area of human eyes to a server-side device for super resolution processing by the server-side device, and receive the part of the video image data corresponding to the viewing direction information of the user from the panoramic video image data with the image reference direction sent by the server-side device, the part of the video image data comprising the gaze area of human eyes and a non-gaze area of human eyes, and a first resolution of the gaze area of human eyes being higher than a second resolution of the non-gaze area of human eyes; or
  receive the part of the video image data corresponding to the viewing direction information of the user from the panoramic video image data with the image reference direction sent by the server-side device, perform super resolution processing on a video image corresponding to the gaze area of human eyes in the part of the video image data according to the gaze area of human eyes determined by the eye movement detector, and display the part of the video image data after the processing.

5. The virtual tourism client device according to claim 1, further comprising a seat and a seat controller;
 the seat comprising a seat body, a backrest, a headrest, and a foot pedal which are kept relatively fixed, and the seat controller being configured to adjust an inclination angle of the seat according to an inclination angle corresponding to road inclination angle information when the obtained part of the video image data comprises the road inclination angle information.

6. The virtual tourism client device according to claim 5, further comprising a head posture detector configured to detect whether the user's head is in a leaning state and generate leaning state information indicating whether the user's head is in the leaning state, the leaning state information being used to determine whether the current viewing direction of the user needs to be corrected according to a road inclination angle corresponding to the road inclination angle information.

7. A virtual tourism system, comprising the virtual tourism client device according to claim 1 and a virtual tourism server-side device, wherein the virtual tourism server-side device comprises an image source memory and a second processor,
 the image source memory being configured to store panoramic video image data of a tourism scene; and
 the second processor being configured to select a corresponding part of video image data from the panoramic video image data according to user viewing direction information sent by the virtual tourism client device and send the part of the video image data to the virtual tourism client device for playing by the virtual tourism client device.

8. The virtual tourism system according to claim 7, further comprising: a video image acquisition device comprising: an image acquisition apparatus and a third processor,
 the image acquisition apparatus being configured to acquire panoramic video image data; and
 the third processor being configured to mark an image reference direction of a panoramic video image in the acquired panoramic video image data according to a movement direction of the image acquisition apparatus while the image acquisition apparatus acquires the panoramic video image data.

9. A virtual tourism server-side device, comprising an image source memory and a second processor, wherein:
 the image source memory is configured to store panoramic video image data of a tourism scene; and
 the second processor is configured to:
 select a corresponding part of video image data from the panoramic video image data according to user viewing direction information sent by a virtual tourism client device and send the part of the video image data to the virtual tourism client device for playing by the virtual tourism client device; and
 receive a head image sent by the virtual tourism client device, calculate a head deflection angle according to the head image by using a computer vision technology, and send the calculated head deflection angle to the virtual tourism client device, wherein
 the second processor being configured to calculate the head deflection angle according to the head image by using the computer vision technology comprises:
 the second processor being configured to: obtain a same target feature in two frames of images by using a target tracking algorithm, calculate a head rotation angle according to a horizontal displacement of the target feature, calculate a head pitch angle according to a vertical displacement of the target feature, and obtain a head swing angle according to an included angle between a connecting line of two target features in a first frame of image and a connecting line of the two target features in a second frame of image; or
 the second processor being configured to: obtain a same target feature in two frames of images by using a target tracking algorithm, perform motion prediction of the target feature, calculate a head rotation angle according to a horizontal displacement and a predicted horizontal displacement of the target feature, calculate a head pitch angle according to a vertical displacement and a predicted vertical displacement of the target feature, and obtain a head swing angle according to an included angle between a connecting line of two target features in a first frame of image and a connecting line of the two target features in a second frame of image.

10. The virtual tourism server-side device according to claim 9, wherein the second processor is further configured to receive viewing image reference direction information sent by the virtual tourism client device, the viewing image reference direction information being used to represent an angle difference between a user-defined viewing image reference direction and an image reference direction of a panoramic video image, and the second processor is configured to select the corresponding part of video image data from the panoramic video image data and send the corresponding part of video image data to the client device based on the viewing image reference direction in combination with the user viewing direction information sent by the virtual tourism client device.

11. The virtual tourism server-side device according to claim 9, wherein the second processor is further configured to receive a speed signal sent by the virtual tourism client device, and in response to a speed indicated by the speed signal exceeding a preset speed threshold, when selecting a part of the video image data from the panoramic video image, extract video image data in a periodical interval of a preset number of frames and send the video image data to the virtual tourism client device to control a speed at which the virtual tourism client device plays video images.

12. The virtual tourism server-side device according to claim 9, wherein, the second processor is further configured to correct a current viewing direction of a user according to a road inclination angle corresponding to road inclination angle information when receiving leaning state information indicating that the user's head is in a leaning state, determining that the panoramic video image data comprises the road inclination angle information, and the virtual tourism client device comprises a seat and a seat controller capable of adjusting the seat according to the road inclination angle, and when selecting the corresponding part of video image data from the panoramic video image data according to the user viewing direction information sent by the virtual tourism client device; or, the second processor is further configured to send the road inclination angle information to the virtual tourism client device in response to the road inclination angle information being comprised in the panoramic video image data to make the virtual tourism client device correct a current viewing direction of a user.

13. The virtual tourism server-side device according to claim 9, wherein, the second processor is further configured to receive information of a gaze area of human eyes sent by a virtual tourism client device, perform super resolution processing on a video image corresponding to the gaze area of human eyes in the selected part of video image data, and send the part of the video image data after the processing to the virtual tourism client device for display, the part of the video image data after the processing comprising the gaze area of human eyes and a non-gaze area of human eyes, and a first resolution of the gaze area of human eyes being higher than a second resolution of the non-gaze area of human eyes.

* * * * *